US012337876B2

(12) United States Patent
Zhang et al.

(10) Patent No.: US 12,337,876 B2
(45) Date of Patent: Jun. 24, 2025

(54) COLLISION DETECTION METHOD, ELECTRONIC DEVICE, AND MEDIUM

(71) Applicant: Beijing Baidu Netcom Science Technology Co., Ltd., Beijing (CN)

(72) Inventors: Lei Zhang, Beijing (CN); Kai Yang, Beijing (CN); Qijuan Yin, Beijing (CN); Wuzhao Zhang, Beijing (CN); Xiaoyan Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 209 days.

(21) Appl. No.: 17/901,428

(22) Filed: Sep. 1, 2022

(65) Prior Publication Data
US 2022/0410939 A1 Dec. 29, 2022

(30) Foreign Application Priority Data
Sep. 2, 2021 (CN) .......................... 202111029395.4

(51) Int. Cl.
*B60W 60/00* (2020.01)
*G08G 1/16* (2006.01)

(52) U.S. Cl.
CPC .......... *B60W 60/0027* (2020.02); *G08G 1/16* (2013.01); *B60W 2754/10* (2020.02)

(58) Field of Classification Search
CPC . B60W 60/0027; B60W 2754/10; G08G 1/16
See application file for complete search history.

(56) References Cited

U.S. PATENT DOCUMENTS

| 5,572,428 A | 11/1996 | Ishida et al. |
| 8,825,265 B1 * | 9/2014 | Ferguson ............ B60W 40/072 701/26 |

(Continued)

FOREIGN PATENT DOCUMENTS

| CN | 109552308 | 4/2019 |
| CN | 109660261 | 4/2019 |

(Continued)

OTHER PUBLICATIONS

First Chinese Office Action, issued in the corresponding Chinese application No. 202111029395.4, dated May 11, 2022.

(Continued)

*Primary Examiner* — Hongye Liang
*Assistant Examiner* — Nada Mahyoob Alqaderi
(74) *Attorney, Agent, or Firm* — HSML P.C.

(57) ABSTRACT

A collision detection method, an electronic device, and a storage medium are provided, which relate to a field of artificial intelligence technology, and in particular to fields of intelligent transportation and autonomous driving technologies. The method includes: determining a predicted travel range of a target object based on a planned travel trajectory of the target object and a historical travel trajectory of the target object; determining, in response to a target obstacle being detected, a predicted travel range of the target obstacle based on a current travel state of the target obstacle; and determining whether the target object has a risk of colliding with the target obstacle, based on the predicted travel range of the target object and the predicted travel range of the target obstacle.

15 Claims, 4 Drawing Sheets

100

(56) References Cited

U.S. PATENT DOCUMENTS

| | | |
|---|---|---|
| 10,403,004 B2 | 9/2019 | Fenney |
| 10,810,763 B2 | 10/2020 | Fenney |
| 10,977,833 B2 | 4/2021 | Fenney |
| 11,260,851 B2 * | 3/2022 | Kniep ................. B60W 30/06 |
| 11,753,005 B2 | 9/2023 | Zhu et al. |
| 2013/0124041 A1 | 5/2013 | Belser et al. |
| 2015/0291159 A1 * | 10/2015 | Sasabuchi ............ G01S 13/867 |
| | | 701/1 |
| 2017/0183004 A1 * | 6/2017 | Bonarens ............. B60W 10/20 |
| 2017/0344855 A1 * | 11/2017 | Mande ................. G06V 20/58 |
| 2019/0110056 A1 | 4/2019 | Fenney |
| 2019/0110082 A1 | 4/2019 | Fenney |
| 2019/0139265 A1 | 5/2019 | Fenney |
| 2019/0367020 A1 * | 12/2019 | Yan ..................... G06V 10/764 |
| 2020/0023842 A1 * | 1/2020 | Gutierrez ............. G06V 20/58 |
| 2020/0180611 A1 * | 6/2020 | Klingemann ........ B60W 50/14 |
| 2020/0290651 A1 | 9/2020 | Pan et al. |
| 2020/0406893 A1 | 12/2020 | Choe et al. |
| 2021/0114617 A1 * | 4/2021 | Phillips ............. G01C 21/3453 |
| 2021/0188263 A1 * | 6/2021 | Zhu ................... B60W 60/0027 |
| 2021/0300412 A1 * | 9/2021 | Dingli ............... B60W 50/0098 |
| 2021/0373566 A1 * | 12/2021 | Agarwal .......... B60W 30/18145 |
| 2022/0371613 A1 * | 11/2022 | Caldwell ............. B60W 60/001 |

FOREIGN PATENT DOCUMENTS

| | | | | |
|---|---|---|---|---|
| CN | 111091591 A | * | 5/2020 | ............... B60Q 1/44 |
| CN | 111401233 A | * | 7/2020 | ......... G06K 9/00335 |
| CN | 111775933 | | 10/2020 | |
| CN | 112026762 | | 12/2020 | |
| CN | 112651557 | | 4/2021 | |
| CN | 112651990 | | 4/2021 | |
| CN | 113212442 | | 8/2021 | |
| JP | 07-104062 | | 4/1995 | |
| JP | 2009-003538 | | 1/2009 | |
| JP | 2012-052884 | | 3/2012 | |
| JP | 2021-098492 | | 7/2021 | |
| WO | 2019/124217 | | 6/2019 | |

OTHER PUBLICATIONS

Second Chinese Office Action, issued in the corresponding Chinese application No. 202111029395.4, dated Jul. 29, 2022.

Extended European Search Report issued in the corresponding European patent application No. 22193700.6, dated Jan. 23, 2023, 9 pages.

Japanese Office Action, issued in the corresponding Japanese patent application No. 2022-121198, dated Sep. 28, 2023, 9 pages.

* cited by examiner

COLLISION DETECTION METHOD, ELECTRONIC DEVICE, AND MEDIUM

CROSS-REFERENCE TO RELATED APPLICATIONS

This application is claims priority to Chinese Application No. 202111029395.4 filed on Sep. 2, 2021, which is incorporated herein by reference in its entirety.

TECHNICAL FIELD

The present disclosure relates to a field of artificial intelligence technology, in particular to fields of intelligent transportation and autonomous driving technologies. More specifically, the present disclosure relates to a collision detection method, an electronic device, and a storage medium.

BACKGROUND

An autonomous vehicle is also called an unmanned vehicle. With a development of artificial intelligence technology, the autonomous vehicle is required to complete all driving operations independently under all road and environmental conditions that human drivers can cope with. This requires the autonomous vehicle to be more intelligent in environmental perception, behavioral decision-making, and motion control.

SUMMARY

The present disclosure provides a collision detection method, an electronic device, and a storage medium.

According to an aspect of the present disclosure, a collision detection method is provided, including: determining a predicted travel range of a target object based on a planned travel trajectory of the target object and a historical travel trajectory of the target object; determining, in response to a target obstacle being detected, a predicted travel range of the target obstacle based on a current travel state of the target obstacle; and determining whether the target object has a risk of colliding with the target obstacle, based on the predicted travel range of the target object and the predicted travel range of the target obstacle.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to determine a predicted travel range of a target object based on a planned travel trajectory of the target object and a historical travel trajectory of the target object; determine, in response to a target obstacle being detected, a predicted travel range of the target obstacle based on a current travel state of the target obstacle; and determine whether the target object has a risk of colliding with the target obstacle, based on the predicted travel range of the target object and the predicted travel range of the target obstacle.

According to another aspect of the present disclosure, a non-transitory computer-readable storage medium having computer instructions therein is provided, wherein the computer instructions are configured to cause a computer to determine a predicted travel range of a target object based on a planned travel trajectory of the target object and a historical travel trajectory of the target object; determine, in response to a target obstacle being detected, a predicted travel range of the target obstacle based on a current travel state of the target obstacle; and determine whether the target object has a risk of colliding with the target obstacle, based on the predicted travel range of the target object and the predicted travel range of the target obstacle.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

During a travel process of an autonomous vehicle, the autonomous vehicle may be required to recognize obstacles such as a vehicle, a pedestrian and a green belt, and provide early warning of a collision risk. In practice, an accuracy and a processing efficiency of the autonomous vehicle need to be improved in terms of recognizing an obstacle, early warning of a collision risk, and avoiding a risk.

The present disclosure provides a collision detection method and apparatus, an electronic device, a storage medium, an autonomous vehicle, and a program product.

According to embodiments of the present disclosure, the collision detection method may include: determining a predicted travel range of a target object based on a planned travel trajectory of the target object and a historical travel trajectory of the target object; determining, in response to a target obstacle being detected, a predicted travel range of the target obstacle based on a current travel state of the target obstacle; and determining whether the target object has a risk of colliding with the target obstacle based on the predicted travel range of the target object and the predicted travel range of the target obstacle.

In the collision detection method provided by embodiments of the present disclosure, the predicted travel range of the target object and the predicted travel range of the target obstacle are used to determine whether the target object has a risk of colliding with the target obstacle. Both the travel range of the target object and the travel range of the target obstacle are predicted, that is, a two-way calculation is performed, which not only improves an accuracy of predicting the collision risk, but also achieves a measurability of the collision risk for the autonomous vehicle.

Collecting, storing, using, processing, transmitting, providing, and disclosing etc. of the personal information of the user involved in the present disclosure all comply with the relevant laws and regulations, are protected by essential security measures, and do not violate the public order and morals. According to the present disclosure, personal information of the user is acquired or collected after such acquirement or collection is authorized or permitted by the user.

Figure 1:
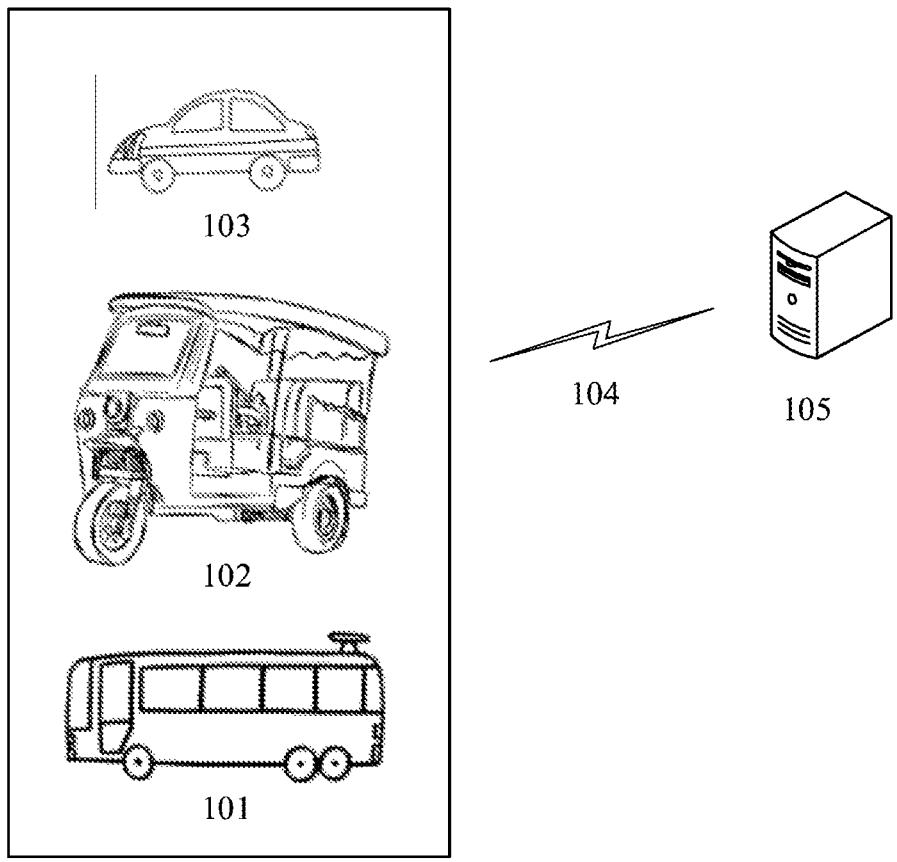
FIG. 1 schematically shows an exemplary system architecture to which a collision detection method and apparatus can be applied according to an embodiment of the present disclosure.

FIG. 1 schematically shows an exemplary system architecture to which a collision detection method and apparatus can be applied according to an embodiment of the present disclosure.

It should be noted that FIG. 1 only shows an example of a system architecture to which an embodiment of the present disclosure can be applied to help those skilled in the art understand the technical content of the present disclosure, but it does not mean that embodiments of the present disclosure cannot be applied to other devices, systems, environments or scenarios.

As shown in FIG. 1, the system architecture 100 according to this embodiment may include autonomous vehicles 101, 102, 103, a network 104, and a server 105. The network 104 is a medium for providing a communication link between the terminal devices 101, 102, 103 and the server 105. The network 104 may include various connection types, such as wired and/or wireless communication links, and the like.

The autonomous vehicles 101, 102, 103 may be vehicles capable of driving automatically, including but not limited to an automobile, a tricycle, a bus, and the like. An autonomous driving control software, a high-precision map application, and the like may be installed in the autonomous vehicles 101, 102, 103. The autonomous vehicles 101, 102, 103 may also be equipped with a perception sensor, such as an imaging apparatus, a laser radar, a millimeter wave radar, an ultrasonic radar, a positioning apparatus, and the like. The autonomous vehicles 101, 102, 103 may collect, by using the perception sensor, a current travel state information, such as a current position, a posture, and a speed, but are not limited thereto. It is also possible for the autonomous vehicles 101, 102, 103 to collect an information of a surrounding environment and a travel state information of an obstacle by using the perception sensor.

The server 105 may be a server that provides various services, such as a background management server (for example only) that supports a request sent by the autonomous vehicles 101, 102, 103. The background management server may perform analysis and other processing on a received request and other data, and feedback a processing result (such as reducing a travel speed, steering, etc.) to the autonomous vehicles 101, 102, 103.

It should be noted that the collision detection method provided by embodiments of the present disclosure may generally be executed by the autonomous vehicle 101, 102, or 103. Accordingly, the collision detection apparatus provided by embodiments of the present disclosure may also be provided in the autonomous vehicle 101, 102, or 103.

For example, an autonomous vehicle detects a target obstacle through an imaging apparatus, and determines a current travel state of the target obstacle based on a perception sensor such as a laser radar. The autonomous vehicle may determine a predicted travel range of the target obstacle based on a current travel state of the target obstacle, and determine a predicted travel range of the autonomous vehicle by using a planned travel trajectory of the autonomous vehicle and a historical travel trajectory of the autonomous vehicle, so as to determine whether the autonomous vehicle has a risk of colliding with the target obstacle based on the predicted travel range of the autonomous vehicle and the predicted travel range of the target obstacle.

Alternatively, the collision detection method provided by embodiments of the present disclosure may also be generally executed by the server 105. Accordingly, the collision detection apparatus provided by embodiments of the present disclosure may generally be provided in the server 105. The collision detection method provided by embodiments of the present disclosure may also be executed by a server or server cluster which is different from the server 105 and capable of communicating with the terminal devices 101, 102, 103 and/or the server 105. Accordingly, the collision detection apparatus provided by embodiments of the present disclosure may also be provided in a server or server cluster which is different from the server 105 and capable of communicating with the terminal devices 101, 102, 103 and/or the server 105.

It should be understood that the number of autonomous vehicles, network and server shown in FIG. 1 is only illustrative. There may be any number of autonomous vehicle, network and server according to the implementation requires.

Figure 2:
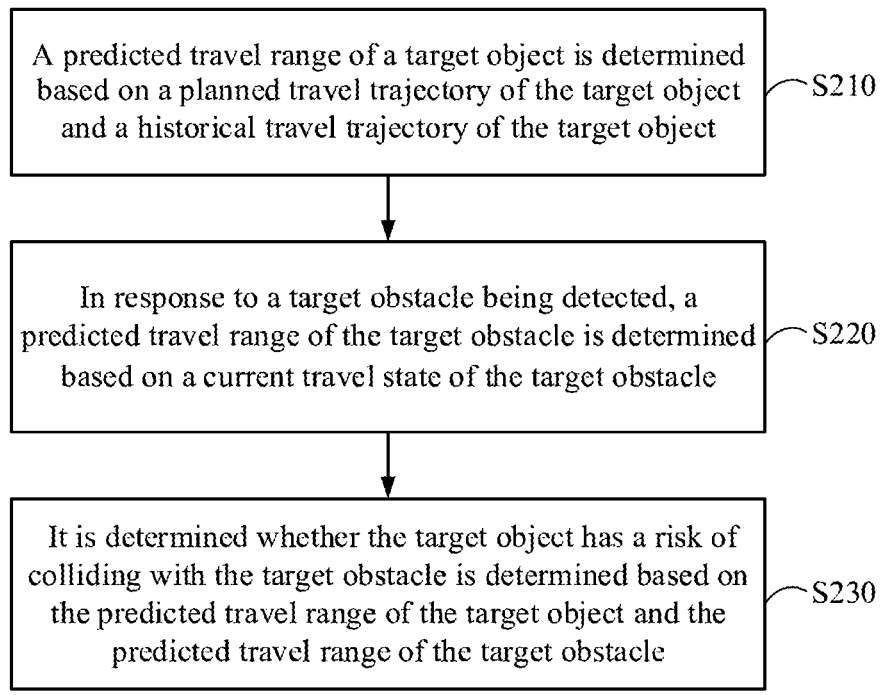
FIG. 2 schematically shows a flowchart of a collision detection method according to an embodiment of the present disclosure.

FIG. 2 schematically shows a flowchart of a collision detection method according to an embodiment of the present disclosure.

As shown in FIG. 2, the method includes operations S210 to S230.

In operation S210, a predicted travel range of a target object is determined based on a planned travel trajectory of the target object and a historical travel trajectory of the target object.

In operation S220, in response to a target obstacle being detected, a predicted travel range of the target obstacle is determined based on a current travel state of the target obstacle.

In operation S230, it is determined whether the target object has a risk of colliding with the target obstacle based on the predicted travel range of the target object and the predicted travel range of the target obstacle.

According to embodiments of the present disclosure, the target object may be an autonomous vehicle. In embodiments of the present disclosure, a type of the autonomous vehicle, such as a model, a size, and a brand of the autonomous vehicle, is not limited.

According to embodiments of the present disclosure, the planned travel trajectory may be a previously planned travel trajectory, and in practice, the planned travel trajectory may be used as navigation to clarify a travel trajectory of the target object.

According to embodiments of the present disclosure, the historical travel trajectory may be an actual travel trajectory that has occurred. In practice, an offset exists between the actual travel trajectory and the planned travel trajectory. An offset between a track point in the planned travel trajectory of the target object and a track point in the historical travel trajectory of the target object matched with the track point in the planned travel trajectory of the target object may be determined according to the planned travel trajectory of the target object and the historical travel trajectory of the target object, and the predicted travel range of the target object may be determined based on the offset and the planned travel trajectory of the target object.

According to embodiments of the present disclosure, the predicted travel range of the target object is determined by using the planned travel trajectory of the target object and the historical travel trajectory of the target object. In combination with an actual application scenario, the offset between the planned travel trajectory and the actual travel trajectory is considered, so that accuracy of the predicted travel range of the target object is increased.

According to embodiments of the present disclosure, a type of the target obstacle is not limited. The target obstacle may be, for example, a fixed target obstacle or a movable obstacle.

According to embodiments of the present disclosure, the obstacle may be determined by using an image information collected by the imaging apparatus, or by using an perception information of the obstacle collected by a radar sensing apparatus. Embodiments of the present disclosure are not limited to this.

According to embodiments of the present disclosure, the type of the target obstacle may be determined based on the current travel state of the target obstacle. It is also possible to determine the predicted travel range of the target obstacle based on the current travel state of the target obstacle.

For example, if moving of a target obstacle does not occur within a preset time period, the target obstacle may be determined as a fixed target obstacle, and thus a current position of the target obstacle may be determined as a predicted travel range of the target obstacle. For example, if moving of the target obstacle occurs within a preset time period, a predicted travel range of the target obstacle may be determined based on a current travel state, for example but not being limited to a travel speed, a travel direction, and other information. It is also possible to comprehensively determine the predicted travel range of the target obstacle by using the current travel state and a travel state monitored within a subsequent time period.

By using the collision detection method provided by embodiments of the present disclosure, the predicted travel range of the movable target obstacle may be predicted. It is possible to determine whether the target object has a risk of colliding with the fixed target obstacle can be determined, and it is also possible to determine whether the target object has a risk of colliding with the movable target obstacle, thereby expanding an application scope of the actual application scenario. In addition, both the predicted travel range of the target object and the predicted travel range of the target obstacle are determined. The two-way data can be calculated, and different calculation data are used for different objects, which is both targeted and measurable, so that the accuracy of predicting the collision risk is higher.

The method according to embodiments of the present disclosure will be further described below in combination with specific embodiments and with reference to FIGS. 3 to 6.

According to embodiments of the present disclosure, an operation of detecting a target obstacle may be performed before performing the operation S220.

For example, a target detection region is determined based on a current position of the target object. In response to an obstacle being detected in the target detection region, a type of the obstacle is determined.

According to embodiments of the present disclosure, the current position of the target object may be determined by positioning through a positioning system.

According to embodiments of the present disclosure, the target detection region may be a circular region with the current position of the target object as a center and a preset length as a radius, but is not limited thereto. The target detection region may be determined according to the current position of the target object and a travel direction of the target object. For example, a sector region having a specific angle is obtained by radiating in the travel direction with the current position of the target object as the center and the preset length as the radius. The sector region is used as the target detection region.

According to embodiments of the present disclosure, determining the target detection region in advance may simplify a screening operation for the target obstacle, thereby improving a screening efficiency for the target obstacle.

According to embodiments of the present disclosure, the type of the obstacle is not limited. The obstacle may be a static obstacle, i.e. a fixed obstacle, such as a green belt, a building, a traffic kiosk on a road, etc. Additionally, the obstacle may be a movable obstacle. The movable obstacle may be an obstacle that travels along a certain planned trajectory over time. For example, the movable obstacle may be a moving vehicle, a pedestrian, a moving bicycle, and the like.

According to embodiments of the present disclosure, if an obstacle is a static obstacle, it may be determined whether the target object has a risk of colliding with the obstacle by using the predicted travel range of the target object and a position of the obstacle. For example, if the position of the obstacle is within the predicted travel range of the target object, it may be determined that the target object has a risk of colliding with the obstacle; and if the position of the obstacle is not within the predicted travel range of the target object, it may be determined that the target object does not have a risk of colliding with the obstacle.

According to embodiments of the present disclosure, if an obstacle is a movable obstacle, it is determined that the obstacle is a target obstacle. Accordingly, if the obstacle is determined as the target obstacle, it may be determined that the target obstacle is detected. Then, a predicted travel range of the target obstacle is determined based on a current travel state of the target obstacle in response to the target obstacle being detected.

With the collision detection method provided by embodiments of the present disclosure, various types of obstacles may be detected, so that the method may be applied widely.

According to embodiments of the present disclosure, the operation S210 may be implemented as following.

For example, a lateral offset between a track point in the planned travel trajectory of the target object and a track point in the historical travel trajectory of the target object within a preset historical time period is calculated, so as to obtain a set of lateral offsets; a first maximum offset between a predicted travel trajectory of the target object and the planned travel trajectory of the target object within a first preset future time period is determined based on the set of lateral offsets; and the predicted travel range of the target object is determined based on the first maximum offset and the planned travel trajectory of the target object.

According to embodiments of the present disclosure, the lateral offset may refer to a lateral deviation amount between a track point in the planned travel trajectory of the target object and a track point in the historical travel trajectory of the target object, which is located in a same line along the longitudinal direction as the track point in the planned travel trajectory of the target object.

Figure 3:
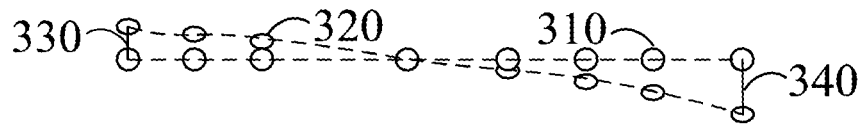
FIG. 3 schematically shows a diagram of determining a lateral offset according to an embodiment of the present disclosure.

FIG. 3 schematically shows a diagram of determining a lateral offset according to an embodiment of the present disclosure.

As shown in FIG. 3, a trajectory formed by circular track points 310 is a planned travel trajectory of a target object and is a substantially straight line. A trajectory formed by elliptical track points 320 is a historical travel trajectory of the target object and has a certain offset from the planned travel trajectory of the target object. A track point in the planned travel trajectory of the target object and a track point in the historical travel trajectory of the target object matched with the track point in the planned travel trajectory of the target object may both be located on a same straight line perpendicular to a travel direction of the planned travel trajectory. A track point in the planned travel trajectory and a track point in the historical travel trajectory matched with the track point in the planned travel trajectory may be collectively referred to as a track point pair, such as a track point pair 330 and a track point pair 340 shown in FIG. 3. A distance between the track points in the track point pair 330 may be the lateral offset.

According to embodiments of the present disclosure, it is possible to select, according to a time interval, a plurality of track points in the historical travel trajectory of the target object within a preset historical time period and a plurality of track points in the planned travel trajectory of the target object respectively matched with the plurality of track points in the historical travel trajectory of the target object, in order to form a plurality of track point pairs. A plurality of lateral offset vectors are calculated based on the plurality of track point pairs, and a set of lateral offset vectors is formed by the plurality of lateral offset vectors.

According to embodiments of the present disclosure, any lateral offset in the set of lateral offsets may be taken as the first maximum offset. Alternatively, the maximum lateral offset in the set of lateral offsets may be taken as the first maximum offset.

According to embodiments of the present disclosure, the preset historical time period may refer to a preset time period closest to a current time instant. The closer the preset historical time period is to the current time instant, the closer a lateral offset in the determined set of lateral offsets is to the lateral offset between the predicted travel trajectory of the target object and the planned travel trajectory of the target object within the first preset future time period.

According to exemplary embodiments of the present disclosure, a Gaussian distribution model may be fitted based on a plurality of lateral offsets in the set of lateral offsets. The first maximum offset between the predicted travel trajectory of the target object and the planned travel trajectory of the target object within the first preset future time period is determined based on the Gaussian distribution model.

According to embodiments of the present disclosure, the length of the first preset future time period is equal to the length of the preset historical time period, but is not limited thereto. The length of the first preset future time period may be greater or less than the length of the preset historical time period.

According to embodiments of the present disclosure, the length of the first preset future time period smaller than the length of the preset historical time period may be set. The first maximum offset is determined using the fitted Gaussian distribution model, the greater the duration of the preset historical time period is, the more data is used for fitting the Gaussian distribution model, thereby increasing a fitting accuracy of the Gaussian distribution model. The length of the first preset future time period being smaller than the length of the preset historical time period is beneficial to improving the prediction accuracy.

According to embodiments of the present disclosure, determining the first maximum offset by using the fitted Gaussian distribution model is more credible and is more applicable in practical application scenes. Accordingly, the travel range is predicted in a high accuracy, thereby improving the accuracy of collision detection.

According to exemplary embodiments of the present disclosure, the lateral offset vector may be determined as following.

For example, the track point in the planned travel trajectory of the target object matched with the track point in the historical travel trajectory of the target object is determined; and the lateral offset between the track point in the historical travel trajectory of the target object and the track point in the planned travel trajectory of the target object is calculated based on a position of the track point in the historical travel trajectory of the target object, a direction at the track point of the historical travel trajectory of the target object, a position of the track point in the planned travel trajectory of the target object, and a direction at the track point of the planned travel trajectory of the target object.

Figure 4:
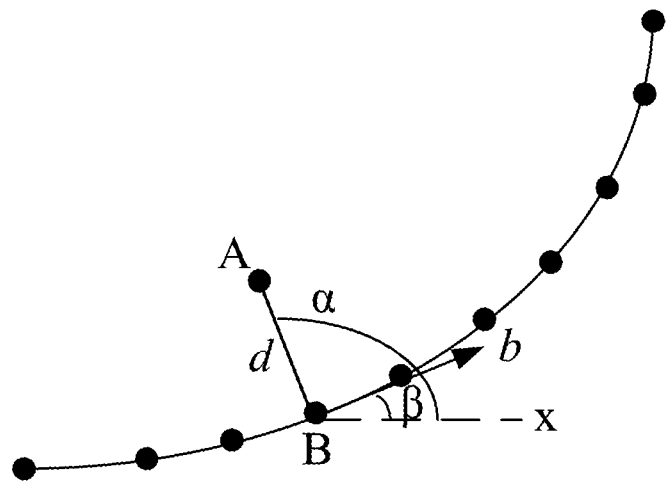
FIG. 4 schematically shows a diagram of determining a lateral offset according to another embodiment of the present disclosure.

FIG. 4 schematically shows a diagram of determining a lateral offset according to another embodiment of the present disclosure.

As shown in FIG. 4, a track point B in a planned travel trajectory of the target object is matched with a track point A in a historical travel trajectory of the target object. The track point A and the track point B form a track point pair. A lateral offset between the track point A and the track point B may be determined based on a position of the track point A, a direction at the track point A, a position of the track point B, and a direction at the track point B. For example, a distance d between the track point A and the track point B may be determined based on the position of the track point A and the position of the track point B. Then, the lateral offset may be determined by the distance d in combination with the travel direction at the track point A and the travel direction at the track point B. For example, the track point A and the planned travel trajectory are mapped into a two-dimensional coordinate system (horizontal and vertical coordinate system). Then, a vector angle between the traveling direction b at the track point B and the horizontal axis X in the horizontal and vertical coordinate system is $\beta$, an angle between the horizontal axis X and a straight line formed by the track point A and the track point B is $\alpha$. The lateral offset vector is obtained based on the distance d, the angle $\beta$, and the angle $\alpha$.

According to embodiments of the present disclosure, the lateral offset may be calculated according to the following equation (1):

$$\text{lat\_offset} = d * \sin(\alpha - \beta) \quad \text{Equation (1)}$$

wherein lat_offset is the lateral offset; d is the distance between the track point A and the track point B; α is an angle between the horizontal axis X and the straight line formed by the track point A and the track point B; β is an angle between the travel direction b at the track point B and the horizontal axis X, where the track point A is a track point in the historical travel trajectory, and the track point B is a track point in the planned travel trajectory matched with the track point A.

According to embodiments of the present disclosure, the operation S220 may be implemented as following.

For example, a planned travel trajectory of the target obstacle is determined based on the current travel state of the target obstacle; an actual travel trajectory of the target obstacle within a preset time period is monitored; a second maximum offset between the predicted travel trajectory of the target obstacle and the planned travel trajectory of the target obstacle within a second preset future time period is determined based on the actual travel trajectory of the target obstacle and the planned travel trajectory of the target obstacle; and the predicted travel range of the target obstacle is determined based on the second maximum offset and the planned travel trajectory of the target obstacle.

According to embodiments of the present disclosure, the current travel state may include a travel direction, a travel speed, a travel acceleration, and/or other information.

According to embodiments of the present disclosure, the current travel direction may be taken as a direction of the planned travel trajectory of the target obstacle, the current position may be taken as a track point in the planned travel trajectory of the target obstacle, and the planned travel trajectory of the target obstacle may be determined based on the track point and the direction of the trajectory.

According to embodiments of the present disclosure, an extension direction of a road on which the target obstacle is located may be taken as the direction of the planned travel trajectory, the current position of the target obstacle may be taken as a track point in the planned travel trajectory, and the planned travel trajectory of the target obstacle may be determined based on the track point and the direction of the trajectory.

According to exemplary embodiments of the present disclosure, for a movable target obstacle, a lateral offset between a track point in the actual travel trajectory of the target obstacle and a track point in the planned travel trajectory of the target obstacle may also conform to the Gaussian distribution model.

According to embodiments of the present disclosure, the second maximum offset may be determined by using the method for determining the first maximum offset. For example, the Gaussian distribution model may be fitted based on a lateral offset between a track point in the actual travel trajectory of the target obstacle and a track point in the planned travel trajectory of the target obstacle, and the second maximum offset may be determined based on the Gaussian distribution model.

According to embodiments of the present disclosure, the Gaussian distribution model is fitted by using the lateral offset between the track point in the actual travel trajectory of the target obstacle and the track point in the planned travel trajectory of the target obstacle, and the second maximum offset is determined based on the Gaussian distribution model. In this way, the predicted travel range of the target obstacle is predicted accurately, and thus the collision risk between the target object and the target obstacle may be reduced.

According to another embodiment of the present disclosure, the operation S220 may also be implemented as following.

For example, a planned travel trajectory of the target obstacle is determined based on the current travel state of the target obstacle; and the predicted travel range of the target obstacle is determined based on the planned travel trajectory of the target obstacle and a preset lateral offset.

According to embodiments of the present disclosure, the current travel state may include a travel direction, a travel speed, a travel acceleration, and/or other information.

According to embodiments of the present disclosure, the current travel direction may be taken as a direction of the planned travel trajectory of the target obstacle, the current position of the target obstacle may be taken as a track point in the planned travel trajectory, and the planned travel trajectory of the target obstacle may be determined based on the track point and the direction of the trajectory.

According to another embodiment of the present disclosure, it is also possible to take an extension direction of a road on which the target obstacle is located as a direction of the planned travel trajectory, take the current position of the target obstacle as a track point in the planned travel trajectory, and determine the planned travel trajectory of the target obstacle based on the track point and the direction of the trajectory.

According to embodiments of the present disclosure, the preset lateral offset may be a fixed value set in advance according to the target obstacle, or a lateral offset threshold, but is not limited thereto. It is also possible to take the travel speed of the target obstacle obtained by monitoring as a lateral travel speed, and calculate the lateral offset based on the preset time period and the lateral travel speed.

According to embodiments of the present disclosure, the approach of predicting the planned travel trajectory may be applied to a scenario in which the target obstacle is a pedestrian or moving bicycle. In the scenario involving the pedestrian or moving bicycle, the pedestrian or bicycle substantially travels along a fixed road, and thus a range of offsetting in the lateral direction is relatively limited. In addition, when the pedestrian or the bicycle are travelling, the offset of the pedestrian or the bicycle with respect to the planned travel trajectory is not large due to a speed limit. Therefore, the result obtained by the method of predicting the planned travel trajectory and the lateral offset according to embodiments of the present disclosure will not have an excessive deviation with respect to the actual situation.

By using the predicted travel range of the target obstacle provided by embodiments of the present disclosure, the prediction accuracy is ensured, the calculation is simplified, and the processing efficiency is increased.

According to embodiments of the present disclosure, a risk of the target object colliding with the target obstacle may be determined based on the predicted travel range of the target object and the predicted travel range of the target obstacle. It may be determined that the target object has a risk of colliding with the target obstacle, in response to determining that the predicted travel range of the target object overlaps the predicted travel range of the target obstacle.

For example, it is determined whether the predicted travel range of the target object overlaps the predicted travel range of the target obstacle or not. It may be determined that the target object has a risk of colliding with the target obstacle, in response to determining that the predicted travel range of the target object overlaps the predicted travel range of the target obstacle; and it may be determined that the target object does not have a risk of colliding with the target obstacle, in response to determining that the predicted travel range of the target object does not overlap the predicted travel range of the target obstacle.

Figure 5:
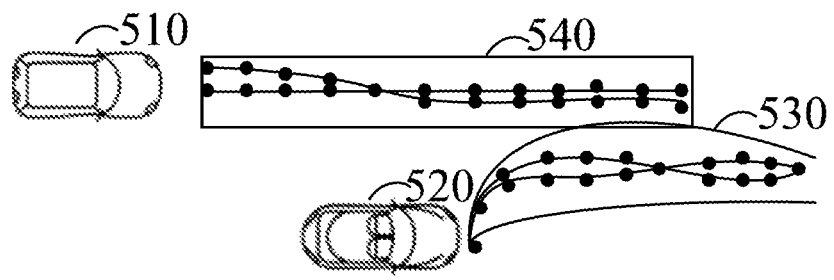
FIG. 5 schematically shows a diagram of a target object having a risk of colliding with a target obstacle according to an embodiment of the present disclosure.

FIG. 5 schematically shows a diagram in which a target object has a risk of colliding with a target obstacle according to an embodiment of the present disclosure.

As shown in FIG. 5, a target object 510 detects that there is a target obstacle 520 in front of the target object 510. In response to the target obstacle 520 being detected, a predicted travel range 530 of the target obstacle 520 is determined based on a current travel state of the target obstacle 520. A predicted travel range 540 of the target object 510 is determined based on a planned travel trajectory of the target object 510 and a historical travel trajectory of the target object 510.

It may be determined that the predicted travel range 530 of the target obstacle 520 overlaps the predicted travel range 540 of the target object 510, based on the predicted travel range 530 of the target obstacle 520 and the predicted travel range 540 of the target object 510. In this case, it may be determined that the target object 510 has a risk of colliding with the target obstacle 520.

In the collision detection method provided by embodiments of the present disclosure, as long as the predicted travel range of the target object overlaps the predicted travel range of the target obstacle, it may be determined that the target object has a risk of colliding with the target obstacle. Accordingly, the ability of warning the risk early and the safety of driving may be improved.

According to embodiments of the present disclosure, it is also possible to determined that the target object has a risk of colliding with the target obstacle, in response to an area of an overlapping range between the predicted travel range of the target object and the predicted travel range of the target obstacle being greater than a preset area threshold. It may be determined that the target object does not have a risk of colliding with the target obstacle, in response to an area of an overlapping range between the predicted travel range of the target object and the predicted travel range of the target obstacle being less than or equal to the preset area threshold.

According to embodiments of the present disclosure, the preset area threshold may be an evaluation standard set in advance according to the actual situation. The value of the preset area threshold is not limited. However, the less the preset area threshold is set, the greater the ability of safety early warning is.

According to embodiments of the present disclosure, by setting a preset area threshold to determine whether a collision risk exists or not, it is possible to reduce the occurrence of misjudgment and improve the prediction accuracy.

According to exemplary embodiments of the present disclosure, it is also possible to determine whether the target object has a risk of colliding with the target obstacle based on the predicted travel range of the target object and the predicted travel range of the target obstacle, as well as attribute information such as a size of the target obstacle and a size of the target object. For example, the predicted travel range of the target object is re-determined on the basis of the predicted travel range of the target object in combination with the size of the target object, in order to obtain an updated predicted travel range of the target object. Similarly, on the basis of the predicted travel range of the target obstacle in combination with the size of the target obstacle, an updated predicted travel range of the target object is obtained.

By using the updated predicted travel range of the target object and the updated predicted travel range of the target obstacle to determine whether the target object has a risk of colliding with the target obstacle, it is possible to avoid a problem that in the trajectory prediction, just the center points of the target object and the target obstacle are considered while the size of the target object and the size of the target obstacle are ignored.

By determining the collision risk in a manner as provided by embodiments of the present disclosure, the size of the target object and the size of the target obstacle are considered as an evaluation factor, improving the applicability to the practical application scene and increasing the accuracy of predicting a collision risk for a relatively large vehicle.

According to embodiments of the present disclosure, if it is determined that the target object does not have a risk of colliding with the target obstacle, the target object may continue to travel according to the planned travel trajectory. If it is determined that the target object has a risk of colliding with the target obstacle, the planned travel trajectory of the target object may be corrected based on the predicted travel range of the target obstacle, so that the target object travels based on the corrected planned travel trajectory of the target object, and does not have a risk of colliding with the target obstacle.

According to embodiments of the present disclosure, if it is determined that the target object has a risk of colliding with the target obstacle, the planned travel trajectory of the target object may be corrected. Accordingly, a series of autonomous driving operations such as collision risk recognition, safety early warning, behavioral decision-making and motion control may be achieved, improve the safety and stability of autonomous driving.

Figure 6:
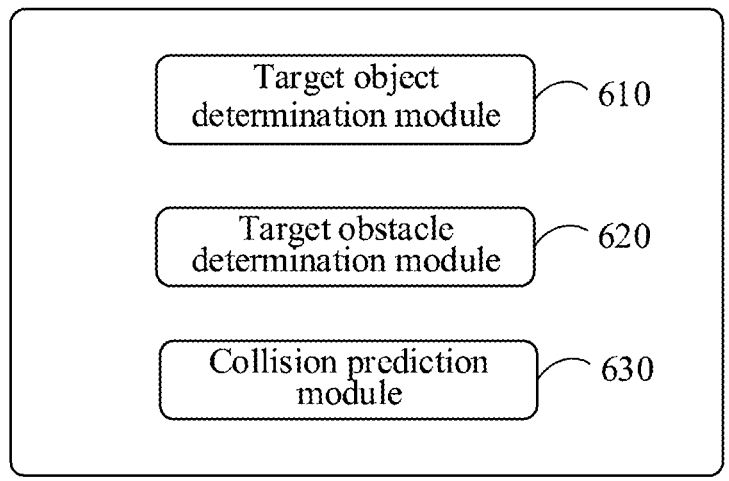
FIG. 6 schematically shows a block diagram of a collision detection apparatus according to an embodiment of the present disclosure.

FIG. 6 schematically shows a block diagram of a collision detection apparatus according to an embodiment of the present disclosure.

As shown in FIG. 6, the collision detection apparatus 600 may include a target object determination module 610, a target obstacle determination module 620, and a collision prediction module 630.

The target object determination module is used to determine a predicted travel range of a target object based on a planned travel trajectory of the target object and a historical travel trajectory of the target object.

The target obstacle determination module is used to determine, in response to a target obstacle being detected, a predicted travel range of the target obstacle based on a current travel state of the target obstacle.

The collision prediction module is used to determine whether the target object has a risk of colliding with the target obstacle, based on the predicted travel range of the target object and the predicted travel range of the target obstacle.

According to embodiments of the present disclosure, the target object determination module may include a calculation unit, a first determination unit, and a second determination unit.

The calculation unit is used to calculate a lateral offset between a track point in the planned travel trajectory of the target object and a track point in the historical travel trajectory of the target object within a preset historical time period, so as to obtain a set of lateral offsets.

The first determination unit is used to determine, based on the set of lateral offsets, a first maximum offset between a predicted travel trajectory of the target object and the planned travel trajectory of the target object within a first preset future time period.

The second determination unit is used to determine the predicted travel range of the target object based on the first maximum offset and the planned travel trajectory of the target object.

According to embodiments of the present disclosure, the calculation unit may include a track point determination sub-unit and a lateral offset determination sub-unit.

The track point determination sub-unit is used to determine the track point in the planned travel trajectory of the target object matched with the track point in the historical travel trajectory of the target object.

The lateral offset determination sub-unit is used to calculate the lateral offset between the track point in the historical travel trajectory of the target object and the track point in the planned travel trajectory of the target object, based on a position of the track point in the historical travel trajectory of the target object, a direction at the track point of the historical travel trajectory of the target object, a position of the track point in the planned travel trajectory of the target object, and a direction at the track point of the planned travel trajectory of the target object.

According to embodiments of the present disclosure, the collision detection apparatus may further include a detection module, a type determination module, and an obstacle determination module.

The detection module is used to determine a target detection region based on a current position of the target object.

The type determination module is used to determine a type of an obstacle in the target detection region in response to the obstacle being detected.

The obstacle determination module is used to determine that the obstacle is the target obstacle in response to the type of the obstacle being a movable type.

According to embodiments of the present disclosure, the target obstacle determination module includes a third determination unit and a fourth determination unit.

The third determination unit is used to determine a planned travel trajectory of the target obstacle based on the current travel state of the target obstacle.

The fourth determination unit is used to determine the predicted travel range of the target obstacle based on the planned travel trajectory of the target obstacle and a preset lateral offset.

According to embodiments of the present disclosure, the target obstacle determination module may include a fifth determination unit, a monitoring unit, a sixth determination unit, and a seventh determination unit.

The fifth determination unit is used to determine a planned travel trajectory of the target obstacle based on the current travel state of the target obstacle.

The monitoring unit is used to monitor an actual travel trajectory of the target obstacle within a preset time period.

The sixth determination unit is used to determine a second maximum offset between the predicted travel trajectory of the target obstacle and the planned travel trajectory of the target obstacle within a second preset future time period, based on the actual travel trajectory of the target obstacle and the planned travel trajectory of the target obstacle.

The seventh determination unit is used to determine the predicted travel range of the target obstacle based on the second maximum offset and the planned travel trajectory of the target obstacle.

According to embodiments of the present disclosure, the collision prediction module may include an overlap determination unit, a first risk determination unit, and a second risk determination unit.

The overlap determination unit is used to determine whether the predicted travel range of the target object overlaps the predicted travel range of the target obstacle or not.

The first risk determination unit is used to determine that the target object has a risk of colliding with the target obstacle, in response to determining that the predicted travel range of the target object overlaps the predicted travel range of the target obstacle.

The second risk determination unit is used to determine that the target object does not have a risk of colliding with the target obstacle, in response to determining that the predicted travel range of the target object does not overlap the predicted travel range of the target obstacle.

According to embodiments of the present disclosure, the collision detection apparatus may further include a correction module.

The correction module is used to correct the planned travel trajectory of the target object based on the predicted travel range of the target obstacle, in response to determining that the target object has a risk of colliding with the target obstacle.

According to embodiments of the present disclosure, the present disclosure further provides an electronic device, a readable storage medium, an autonomous vehicle, and a computer program product.

According to embodiments of the present disclosure, the electronic device includes at least one processor; and a memory communicatively connected to the at least one processor, wherein the memory stores instructions executable by the at least one processor, and the instructions, when executed by the at least one processor, cause the at least one processor to implement the methods described above.

According to embodiments of the present disclosure, the non-transitory computer-readable storage medium has computer instructions therein, wherein the computer instructions are used to cause a computer to implement the methods described above.

According to embodiments of the present disclosure, the computer program product contains a computer program, wherein the computer program, when executed by a processor, causes the processor to implement the methods described above.

Figure 7:
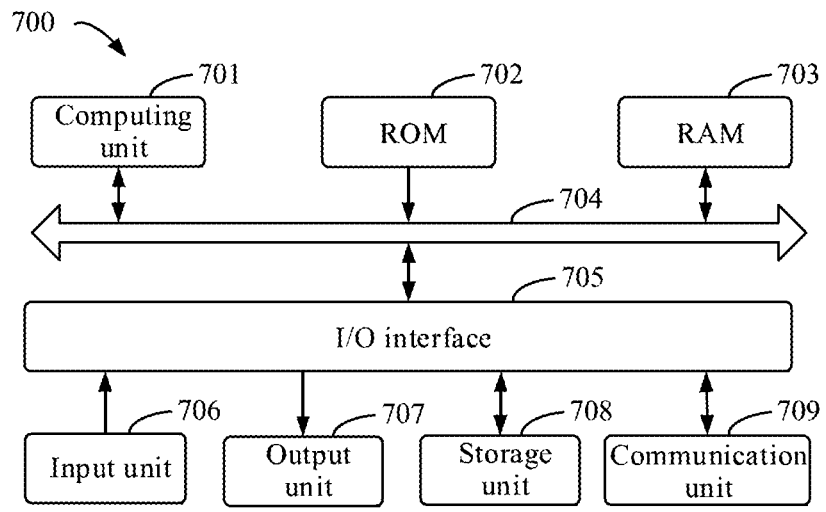
FIG. 7 schematically shows a block diagram of an electronic device suitable for implementing a collision detection method according to an embodiment of the present disclosure.

FIG. 7 schematically shows a block diagram of an exemplary electronic device 700 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the device 700 includes a computing unit 701 which may perform various appropriate actions and processes according to a computer program stored in a read only memory (ROM) 702 or a computer program loaded from a storage unit 708 into a random access memory (RAM) 703. In the RAM 703, various programs and data necessary for an operation of the device 700 may also be stored. The computing unit 701, the ROM 702 and the RAM 703 are connected to each other through a bus 704. An input/output (I/O) interface 705 is also connected to the bus 704.

A plurality of components in the device 700 are connected to the I/O interface 705, including: an input unit 706, such as a keyboard, or a mouse; an output unit 707, such as displays or speakers of various types; a storage unit 708, such as a disk, or an optical disc; and a communication unit 709, such as a network card, a modem, or a wireless communication transceiver. The communication unit 709 allows the device 700 to exchange information/data with other devices through a computer network such as Internet and/or various telecommunication networks.

The computing unit 701 may be various general-purpose and/or dedicated processing assemblies having processing and computing capabilities. Some examples of the computing units 701 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 701 executes various methods and processes described above, such as the collision detection method. For example, in some embodiments, the collision detection method may be implemented as a computer software program which is tangibly embodied in a machine-readable medium, such as the storage unit 708. In some embodiments, the computer program may be partially or entirely loaded and/or installed in the device 700 via the ROM 702 and/or the communication unit 709. The computer program, when loaded in the RAM 703 and executed by the computing unit 701, may execute one or more steps in the collision detection method. Alternatively, in other embodiments, the computing unit 701 may be configured to perform the collision detection method by any other suitable means (e.g., by means of firmware).

Based on the electronic device described above, the electronic device may acquire the planned travel trajectory of the target object and the historical travel trajectory of the target object, determine the predicted travel range of the target object based on the planned travel trajectory of the target object and the historical travel trajectory of the target object, determine the predicted travel range of the target obstacle based on the current travel state of the target obstacle, and determine whether the target object has a risk of colliding with the target obstacle based on the predicted travel range of the target object and the predicted travel range of the target obstacle.

Based on the electronic device described above, the present disclosure further provides an autonomous vehicle, which may include the electronic device, and may also include a communication component, a perception sensor for collecting an information of a surrounding environment, and the like. The communication component and the perception sensor are communicatively connected to the electronic device.

The electronic device may be integrated with the communication component and the perception sensor. Alternatively, the electronic device may be provided separately from the communication component and the perception sensor.

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server can be a cloud server, a distributed system server, or a server combined with blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A collision detection method performed by an autonomous vehicle, the method comprising: in a travel process of the autonomous vehicle,
    determining a predicted travel range of the autonomous vehicle based on a planned travel trajectory of the autonomous vehicle and a historical travel trajectory of the autonomous vehicle;
    determining, in response to a target obstacle being detected by the autonomous vehicle using a first perception sensor of the autonomous vehicle, a predicted travel range of the target obstacle based on a current travel state of the target obstacle determined by the autonomous vehicle using a second perception sensor of the autonomous vehicle;
    determining whether the autonomous vehicle has a risk of colliding with the target obstacle, based on the predicted travel range of the autonomous vehicle and the predicted travel range of the target obstacle;
    correcting the planned travel trajectory of the autonomous vehicle based on the predicted travel range of the target obstacle, in response to determining that the autonomous vehicle has a risk of colliding with the target obstacle; and
    controlling the autonomous vehicle to travel based on the corrected planned travel trajectory, so as to avoid the target obstacle;
    wherein the determining a predicted travel range of the autonomous vehicle based on a planned travel trajectory of the autonomous vehicle and a historical travel trajectory of the autonomous vehicle includes:
    calculating a lateral offset between a track point in the planned travel trajectory of the autonomous vehicle and a track point in the historical travel trajectory of the autonomous vehicle within a preset historical time period, so as to obtain a set of lateral offsets;
    determining, based on the set of lateral offsets, a first maximum offset between a predicted travel trajectory of the autonomous vehicle and the planned travel trajectory of the autonomous vehicle within a first preset future time period; and
    determining the predicted travel range of the autonomous vehicle based on the first maximum offset and the planned travel trajectory of the autonomous vehicle.

2. The method according to claim 1, wherein the calculating the lateral offset between the track point in the planned travel trajectory of the autonomous vehicle and the track point in the historical travel trajectory of the autonomous vehicle within the preset historical time period so as to obtain the set of lateral offsets comprises:
    determining the track point in the planned travel trajectory of the autonomous vehicle matched with the track point in the historical travel trajectory of the autonomous vehicle; and
    calculating the lateral offset between the track point in the historical travel trajectory of the autonomous vehicle and the track point in the planned travel trajectory of the autonomous vehicle, based on a position of the track point in the historical travel trajectory of the autonomous vehicle, a direction at the track point of the historical travel trajectory of the autonomous vehicle, a position of the track point in the planned travel trajectory of the autonomous vehicle, and a direction at the track point of the planned travel trajectory of the autonomous vehicle.

3. The method according to claim 1, further comprising:
    determining a target detection region based on a current position of the autonomous vehicle;
    determining a type of an obstacle in the target detection region in response to the obstacle being detected; and
    determining that the obstacle is the target obstacle in response to the type of the obstacle being a movable type.

4. The method according to claim 1, wherein the determining, in response to the target obstacle being detected by the autonomous vehicle using the first perception sensor of the autonomous vehicle, the predicted travel range of the target obstacle based on the current travel state of the target obstacle determined by the autonomous vehicle using the second perception sensor of the autonomous vehicle comprises:
    determining a planned travel trajectory of the target obstacle based on the current travel state of the target obstacle; and
    determining the predicted travel range of the target obstacle based on the planned travel trajectory of the target obstacle and a preset lateral offset.

5. The method according to claim 1, wherein the determining, in response to the target obstacle being detected by the autonomous vehicle using the first perception sensor of the autonomous vehicle, the predicted travel range of the target obstacle based on the current travel state of the target obstacle determined by the autonomous vehicle using the second perception sensor of the autonomous vehicle comprises:
    determining a planned travel trajectory of the target obstacle based on the current travel state of the target obstacle;
    monitoring an actual travel trajectory of the target obstacle within a preset time period;

determining a second maximum offset between the predicted travel trajectory of the target obstacle and the planned travel trajectory of the target obstacle within a second preset future time period, based on the actual travel trajectory of the target obstacle and the planned travel trajectory of the target obstacle; and determining the predicted travel range of the target obstacle based on the second maximum offset and the planned travel trajectory of the target obstacle.

6. The method according to claim 1, wherein the determining whether the autonomous vehicle has the risk of colliding with the target obstacle based on the predicted travel range of the autonomous vehicle and the predicted travel range of the target obstacle comprises:

determining whether the predicted travel range of the autonomous vehicle overlaps the predicted travel range of the target obstacle or not;

determining that the autonomous vehicle has a risk of colliding with the target obstacle, in response to determining that the predicted travel range of the autonomous vehicle overlaps the predicted travel range of the target obstacle; and determining that the autonomous vehicle does not have a risk of colliding with the target obstacle, in response to determining that the predicted travel range of the autonomous vehicle does not overlap the predicted travel range of the target obstacle.

7. An electronic device, comprising:

at least one processor; and a memory communicatively connected to the at least one processor, wherein the memory stores instructions executable by the at least one processor, and the instructions, when executed by the at least one processor, cause the at least one processor to: in a travel process of an autonomous vehicle, determine a predicted travel range of a autonomous vehicle based on a planned travel trajectory of the autonomous vehicle and a historical travel trajectory of the autonomous vehicle;

determine, in response to a target obstacle being detected by the autonomous vehicle using a first perception sensor of the autonomous vehicle, a predicted travel range of the target obstacle based on a current travel state of the target obstacle determined by the autonomous vehicle using a second perception sensor of the autonomous vehicle;

determine whether the autonomous vehicle has a risk of colliding with the target obstacle, based on the predicted travel range of the autonomous vehicle and the predicted travel range of the target obstacle;

correct the planned travel trajectory of the autonomous vehicle based on the predicted travel range of the target obstacle, in response to determining that the autonomous vehicle has a risk of colliding with the target obstacle;

and control the autonomous vehicle to travel based on the corrected planned travel trajectory, so as to avoid the target obstacle;

wherein the at least one processor is further configured to:

calculate a lateral offset between a track point in the planned travel trajectory of the autonomous vehicle and a track point in the historical travel trajectory of the autonomous vehicle within a preset historical time period, so as to obtain a set of lateral offsets;

determine, based on the set of lateral offsets, a first maximum offset between a predicted travel trajectory of the autonomous vehicle and the planned travel trajectory of the autonomous vehicle within a first preset future time period; and determine the predicted travel range of the autonomous vehicle based on the first maximum offset and the planned travel trajectory of the autonomous vehicle.

8. The electronic device according to claim 7, wherein the at least one processor is further configured to:

determine the track point in the planned travel trajectory of the autonomous vehicle matched with the track point in the historical travel trajectory of the autonomous vehicle; and calculate the lateral offset between the track point in the historical travel trajectory of the autonomous vehicle and the track point in the planned travel trajectory of the autonomous vehicle, based on a position of the track point in the historical travel trajectory of the autonomous vehicle, a direction at the track point of the historical travel trajectory of the autonomous vehicle, a position of the track point in the planned travel trajectory of the autonomous vehicle, and a direction at the track point of the planned travel trajectory of the autonomous vehicle.

9. The electronic device according to claim 7, wherein the at least one processor is further configured to:

determine a target detection region based on a current position of the autonomous vehicle;

determine a type of an obstacle in the target detection region in response to the obstacle being detected; and determine that the obstacle is the target obstacle in response to the type of the obstacle being a movable type.

10. The electronic device according to claim 7, wherein the at least one processor is further configured to:

determine a planned travel trajectory of the target obstacle based on the current travel state of the target obstacle; and determine the predicted travel range of the target obstacle based on the planned travel trajectory of the target obstacle and a preset lateral offset.

11. The electronic device according to claim 7, wherein the at least one processor is further configured to:

determine a planned travel trajectory of the target obstacle based on the current travel state of the target obstacle;

monitor an actual travel trajectory of the target obstacle within a preset time period;

determine a second maximum offset between the predicted travel trajectory of the target obstacle and the planned travel trajectory of the target obstacle within a second preset future time period, based on the actual travel trajectory of the target obstacle and the planned travel trajectory of the target obstacle; and determine the predicted travel range of the target obstacle based on the second maximum offset and the planned travel trajectory of the target obstacle.

12. The electronic device according to claim 7, wherein the at least one processor is further configured to:

determine whether the predicted travel range of the autonomous vehicle overlaps the predicted travel range of the target obstacle or not;

determine that the autonomous vehicle has a risk of colliding with the target obstacle, in response to determining that the predicted travel range of the autonomous vehicle overlaps the predicted travel range of the target obstacle; and determine that the autonomous vehicle does not have a risk of colliding with the target obstacle, in response to determining that the predicted travel range of the autonomous vehicle does not overlap the predicted travel range of the target obstacle.

13. A non-transitory computer-readable storage medium having computer instructions therein, wherein the computer instructions are configured to cause a computer to: in a travel process of an autonomous vehicle,
   determine a predicted travel range of the autonomous vehicle based on a planned travel trajectory of the autonomous vehicle and a historical travel trajectory of the autonomous vehicle;
   determine, in response to a target obstacle being detected by the autonomous vehicle using a first perception sensor of the autonomous vehicle, a predicted travel range of the target obstacle based on a current travel state of the target obstacle determined by the autonomous vehicle using a second perception sensor of the autonomous vehicle;
   determine whether the autonomous vehicle has a risk of colliding with the target obstacle, based on the predicted travel range of the autonomous vehicle and the predicted travel range of the target obstacle; and
   correct the planned travel trajectory of the autonomous vehicle based on the predicted travel range of the target obstacle, in response to determining that the autonomous vehicle has a risk of colliding with the target obstacle; and
   control the autonomous vehicle to travel based on the corrected planned travel trajectory, so as to avoid the target obstacle;
   wherein the computer instructions are further configured to cause the computer to:
      calculate a lateral offset between a track point in the planned travel trajectory of the autonomous vehicle and a track point in the historical travel trajectory of the autonomous vehicle within a preset historical time period, so as to obtain a set of lateral offsets;
      determine, based on the set of lateral offsets, a first maximum offset between a predicted travel trajectory of the autonomous vehicle and the planned travel trajectory of the autonomous vehicle within a first preset future time period; and
      determine the predicted travel range of the autonomous vehicle based on the first maximum offset and the planned travel trajectory of the autonomous vehicle.

14. The medium according to claim 13, wherein the computer instructions are further configured to cause the computer to:
   determine the track point in the planned travel trajectory of the autonomous vehicle matched with the track point in the historical travel trajectory of the autonomous vehicle; and
   calculate the lateral offset between the track point in the historical travel trajectory of the autonomous vehicle and the track point in the planned travel trajectory of the autonomous vehicle, based on a position of the track point in the historical travel trajectory of the autonomous vehicle, a direction at the track point of the historical travel trajectory of the autonomous vehicle, a position of the track point in the planned travel trajectory of the autonomous vehicle, and a direction at the track point of the planned travel trajectory of the autonomous vehicle.

15. The medium according to claim 13, wherein the computer instructions are further configured to cause the computer to:
   determine a target detection region based on a current position of the autonomous vehicle;
   determine a type of an obstacle in the target detection region in response to the obstacle being detected; and
   determining that the obstacle is the target obstacle in response to the type of the obstacle being a movable type.

* * * * *